US012769746B2

(12) United States Patent
Wolmer

(10) Patent No.: US 12,769,746 B2
(45) Date of Patent: Oct. 20, 2026

(54) TECHNIQUES FOR GENERATING LANGUAGE MODEL CONTEXT BASED ON A KNOWLEDGE GRAPH

(71) Applicant: Naboo.ai, LTD, Tel Aviv (IL)

(72) Inventor: Dror Wolmer, Tel Aviv (IL)

(73) Assignee: Naboo.ai, LTD, Tel Aviv (IL)

( * ) Notice: Subject to any disclaimer, the term of this patent is extended or adjusted under 35 U.S.C. 154(b) by 0 days.

(21) Appl. No.: 18/784,487

(22) Filed: Jul. 25, 2024

(65) Prior Publication Data

US 2026/0030251 A1 Jan. 29, 2026

(51) Int. Cl.
*G06F 16/2457* (2019.01)
*G06F 16/242* (2019.01)

(52) U.S. Cl.
CPC ...... *G06F 16/24578* (2019.01); *G06F 16/243* (2019.01)

(58) Field of Classification Search
CPC .......................... G06F 16/24578; G06F 16/243
See application file for complete search history.

(56) References Cited

U.S. PATENT DOCUMENTS

| | | | | |
|---|---|---|---|---|
| 10,331,683 | B2 * | 6/2019 | Borse | G06F 16/951 |
| 11,436,469 | B2 | 9/2022 | Marin et al. | |
| 11,507,851 | B2 | 11/2022 | Lee et al. | |
| 11,868,733 | B2 | 1/2024 | Aditya et al. | |
| 2010/0312644 | A1 * | 12/2010 | Borgs | G06Q 30/02 715/764 |
| 2022/0094606 | A1 * | 3/2022 | Casey | H04L 41/069 |
| 2022/0366389 | A1 * | 11/2022 | Parker | G06Q 10/1093 |
| 2024/0004931 | A1 * | 1/2024 | Vangala | G06F 16/9038 |
| 2024/0111658 | A1 * | 4/2024 | Bo | G06F 11/3624 |
| 2024/0256588 | A1 * | 8/2024 | Bischof | G06F 16/316 |
| 2024/0394285 | A1 * | 11/2024 | Cunningham | H04L 51/02 |
| 2024/0403658 | A1 * | 12/2024 | Rigterink | G06N 5/022 |
| 2024/0419835 | A1 * | 12/2024 | Karlberg | G06N 3/04 |
| 2025/0061352 | A1 * | 2/2025 | Solmaz | G06N 5/022 |
| 2025/0086188 | A1 * | 3/2025 | Wang | G06F 16/284 |
| 2025/0371048 | A1 * | 12/2025 | AlShikh | G06F 40/40 |

OTHER PUBLICATIONS

U.S. Appl. No. 63/654,558, filed Mar. 14, 2024. (Year: 2024).*

* cited by examiner

*Primary Examiner* — Jay A Morrison
(74) *Attorney, Agent, or Firm* — M&B IP Analysts, LLC

(57) ABSTRACT

A system and method for generating a query response from a knowledgebase is presented. The method includes: generating a knowledge graph based on a plurality of data sources of a computing environment, the knowledge graph including a plurality of nodes representing computing environment entities; receiving a natural language query; extracting from the natural language query at least a computing environment entity; traversing the knowledge graph to detect a second node connected to a first node representing the computing environment entity; generating a context for a language model including data extracted from the second node; generating a prompt for the language model based on the generated context and the received natural language query; and processing the prompt to generate a response.

27 Claims, 5 Drawing Sheets

TECHNIQUES FOR GENERATING LANGUAGE MODEL CONTEXT BASED ON A KNOWLEDGE GRAPH

TECHNICAL FIELD

The present disclosure relates generally to knowledgebase querying, and specifically to enhancing context for generating query responses utilizing a language model.

BACKGROUND

Maintaining a cloud computing environment that relies heavily on numerous third-party services is complex due to the intricate web of dependencies and interactions between various services. Each third-party service has its own APIs, documentation, update cycles, and potential issues, requiring constant monitoring and management. Compatibility issues can arise as different services update at different times, potentially breaking integrations that were previously functioning smoothly.

Additionally, security becomes a major concern, as each service introduces its own set of vulnerabilities and requires careful management of access controls, permissions, and data encryption. Keeping track of the security practices of each third-party provider and ensuring they meet the necessary standards adds another layer of complexity.

Performance and reliability are also affected, as the cloud environment's overall performance is dependent on the performance of each third-party service. If one service experiences downtime or latency issues, it can impact the entire system's functionality. This necessitates the implementation of robust monitoring and alerting systems to quickly identify and address any issues.

Overall, the intricate dependencies, security concerns, performance issues, and financial management make maintaining a cloud environment with many third-party services a complex and demanding task.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a knowledge graph based on a plurality of data sources of a computing environment, the knowledge graph including a plurality of nodes representing computing environment entities. Method may also include receiving a natural language query. Method may furthermore include extracting from the natural language query at least a computing environment entity. Method may in addition include traversing the knowledge graph to detect a second node connected to a first node representing the computing environment entity. Method may moreover include generating a context for a language model including data extracted from the second node. Method may also include generating a prompt for the language model based on the generated context and the received natural language query. Method may furthermore include processing the prompt to generate a response. Other embodiments of this aspect include corresponding computer systems, apparatus, and computer programs recorded on one or more computer storage devices, each configured to perform the actions of the methods.

Implementations may include one or more of the following features. Method may include: accessing a version control system (VCS) of the computing environment; and generating the knowledge graph based on metadata and data extracted from the VCS. Method may include: generating a third node in the knowledge graph, the third node representing a code object accessed through the VCS. Method may include: accessing an issue tracking system of the computing environment; extracting data related to the computing environment entity from a ticket of the issue tracking system; and generating a representation in the knowledge graph of the computing environment entity based on the extracted data. Method may include: determining a context length of the language model; and continuously traversing the knowledge graph to detect a plurality of second nodes. Method may include: generating the context based on the plurality of second nodes and the determined context length. Method may include: generating the prompt further based on a preexisting prompt template. Method may include: processing a predetermined prompt by a language model based on the preexisting prompt template, the generated context and the received natural language query. Method may include: traversing the knowledge graph to detect a plurality of neighbor nodes, each neighbor node connected to the first node by a number of nodes less than a predetermined value. Method may include: generating the knowledge graph prior to receiving the natural language query. Method may include: generating a relevancy score for each data source of the plurality of data sources. Method may include: generating the relevancy score for each identity of a plurality of identities. Method may include: generating the context further based on the relevancy score. Implementations of the described techniques may include hardware, a method or process, or a computer tangible medium.

In one general aspect, non-transitory computer-readable medium may include one or more instructions that, when executed by one or more processors of a device, cause the device to: generate a knowledge graph based on a plurality of data sources of a computing environment, the knowledge graph including a plurality of nodes representing computing environment entities; receive a natural language query; extract from the natural language query at least a computing environment entity; traverse the knowledge graph to detect a second node connected to a first node representing the computing environment entity; generate a context for a language model including data extracted from the second node; generate a prompt for the language model based on the generated context and the received natural language query; and process the prompt to generate a response. Other embodiments of this aspect include corresponding computer systems, apparatus, and computer programs recorded on one or more computer storage devices, each configured to perform the actions of the methods.

In one general aspect, system may include one or more processors configured to: generate a knowledge graph based on a plurality of data sources of a computing environment, the knowledge graph including a plurality of nodes representing computing environment entities. System may furthermore receive a natural language query. System may in addition extract from the natural language query at least a computing environment entity. System may moreover traverse the knowledge graph to detect a second node connected to a first node representing the computing environment entity. System may also generate a context for a language model including data extracted from the second node. System may furthermore generate a prompt for the language model based on the generated context and the received natural language query. System may in addition process the prompt to generate a response. Other embodiments of this aspect include corresponding computer systems, apparatus, and computer programs recorded on one or more computer storage devices, each configured to perform the actions of the methods.

Implementations may include one or more of the following features. System where the one or more processors are further configured to: access a version control system (VCS) of the computing environment; and generate the knowledge graph based on metadata and data extracted from the VCS. System where the one or more processors are further configured to: generate a third node in the knowledge graph, the third node representing a code object accessed through the VCS. System where the one or more processors are further configured to: access an issue tracking system of the computing environment; extract data related to the computing environment entity from a ticket of the issue tracking system; and generate a representation in the knowledge graph of the computing environment entity based on the extracted data. System where the one or more processors are further configured to: determine a context length of the language model; and continuously traverse the knowledge graph to detect a plurality of second nodes. System where the one or more processors are further configured to: generate the context based on the plurality of second nodes and the determined context length. System where the one or more processors are further configured to: generate the prompt further based on a preexisting prompt template. System where the one or more processors are further configured to: process a predetermined prompt by a language model based on the preexisting prompt template, the generated context and the received natural language query. System where the one or more processors are further configured to: traverse the knowledge graph to detect a plurality of neighbor nodes, each neighbor node connected to the first node by a number of nodes less than a predetermined value. System where the one or more processors are further configured to: generate the knowledge graph prior to receiving the natural language query. System where the one or more processors are further configured to: generate a relevancy score for each data source of the plurality of data sources. System where the one or more processors are further configured to: generate the relevancy score for each identity of a plurality of identities. System where the one or more processors are further configured to: generate the context further based on the relevancy score. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
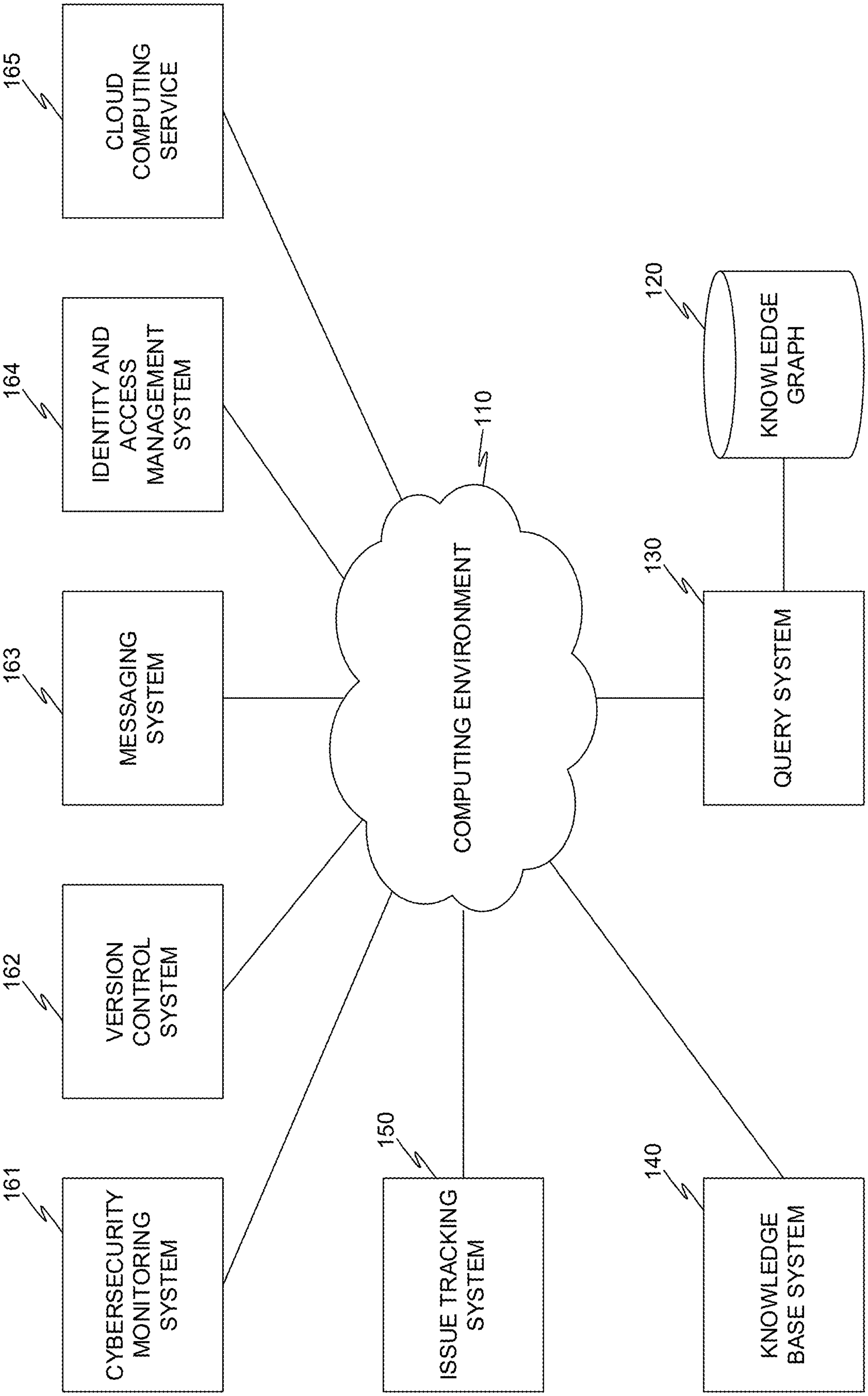
FIG. 1 is an example schematic diagram of a computing environment with a query system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment with a query system, utilized to describe an embodiment. According to an embodiment, a computing environment 110 includes a plurality of entities. In an embodiment, the computing environment 110 is a cloud computing environment, a hybrid computing environment, an on-prem environment, a networked computing environment, a combination thereof, and the like.

For example, in an embodiment, a cloud computing environment is implemented on a cloud computing infrastructure, such as Amazon® Web Service (AWS), Google® Cloud Platform (GCP), Microsoft® Azure, and the like.

In an embodiment, an entity is, for example, a cloud entity, a resource, an identity, a principal, and the like. In some embodiment, a resource is a physical resource, a virtual resource, etc. In certain embodiments, a resource is a virtual machine, a software container, a serverless function, a combination thereof, and the like. In an embodiment, the resource is a workload, a virtualization, a software application, a software appliance, a software library, a software binary, a combination thereof, and the like.

In an embodiment, the computing environment 110 is communicatively coupled with a plurality of software environments, software providers, various systems, etc. For example, in an embodiment, the computing environment 110 is communicatively coupled with a knowledgebase (KB) system 140, an issue tracking system 150, a cybersecurity monitoring system 161, a version control system (VCS) 162, a messaging system 163, an identity and access management (IAM) system 164, a cloud computing service 165, a combination thereof, and the like.

For example, according to an embodiment, an issue tracking system 150 is Jira, a cybersecurity monitoring system 161 is Snyk®, a VCS 162 is Github®, a messaging system 163 is Slack®, an IAM system 164 is Okta®, a cloud computing service 165 is AWS S3, etc.

In an embodiment, each system, software service, software as a service (SaaS), platform as a service (PaaS), infrastructure as a service (IaaS), etc., which is connected to the computing environment 110 interacts with the computing environment. For example, in certain embodiment, a user of the computing environment 110 has a user account of the computing environment 110, identified, for example, by a user account identification (e.g., an email address).

The same user has, according to an embodiment, a user account in the messaging system 163 used by the computing environment 110. Thus, the same identity has a user account related to the computing system, in multiple different environments, services, etc.

In some embodiments, the various principals of the different environments interact with the computing environment 110, with each other, etc. As an example, in an embodiment, a cybersecurity monitoring system 161 detects a cybersecurity issue in the computing environment 110. The cybersecurity monitoring system 161 then generates a ticket in an issue tracking system 150. In an embodiment, the issue tracking system 150 is configured to assign the generated ticket to a user account of the issue tracking system 150.

In certain embodiments, a plurality of user accounts on a messaging system 163 are notified of the ticket generation. Once the assigned user account resolves the ticket, another message is sent on the messaging system 163 to notify other user accounts that the issue is resolved. In some embodiments, the user associated with the user account which resolved the issue in the issue tracking system 150 generates an article in a KB system 140 detailing the detected incident and how it was resolved.

In this example embodiment, a single human user is responsible for multiple actions, events, changes, etc., using multiple different user accounts, utilizing different systems, etc. This simple example illustrates the number of different systems and accounts utilizing by a single user. In typical computing environments, hundreds of different users use different accounts, different systems, etc. Tracking and ascertaining activity for a particular user or activity are therefore an incredible task.

In an embodiment, each system (e.g., KB system 140, issue tracking system 150, cybersecurity monitoring system 161, etc.) includes structured data (such as a database of alert records) and unstructured data (such as an article in a corporate wiki).

According to an embodiment, the computing environment 110 is further connected to a query system 130. In an embodiment, the query system 130 is configured to access the plurality of systems connected to, associated with, etc., the computing environment 110. In some embodiments, the query system 130 is configured to generate representations based on data extracted from each system, and store such a representation in a knowledge graph 120.

In an embodiment, the knowledge graph is implemented as a graph database, such as Neo4j®. In an embodiment, the knowledge graph includes a plurality of nodes, each node representation a data, a resource, a principal, an entity, a combination thereof, and the like, of the computing environment 110.

In some embodiments, the query system 130 is configured to generate the representation based on a predetermined database schema. In an embodiment, the query system 130 has a predetermined database schema for each data source (e.g., each of the plurality of systems).

For example, according to an embodiment, an article is represented by a node in the knowledge graph. In an embodiment, the node representing the article further includes metadata, such as keywords of the article. In some embodiments, the nodes in the knowledge graph are connected by edges.

In an embodiment, each edge is associated with a weight value. In some embodiments, the query system 130 is configured to generate a unified identity based on a plurality of user accounts. In an embodiment, each unified identity is associated with a plurality of weight values for the knowledge graph, such that a first identity has a first weight for a first edge between a pair of nodes, and a second identity has a second weight for the first edge. This allows, according to an embodiment, querying of the knowledge graph with results which are contextualized for each identity, thereby increasing the relevancy of the results.

In some embodiments, the query system 130 is configured to generate a unified identity based on heuristics, action matching, event matching, a combination thereof, and the like. For example, in an embodiment, two user accounts having a similar handle (i.e., identifier) are associated with a single identity, e.g., in response to detecting that a vector distance between vector representation of each is below a predetermined threshold. For example, using Word2Vec, each user identifier is vectorized and a distance is determined between them. According to an embodiment, where the user identifier is below a threshold value, the user account identifier is associated with a unified identity.

In some embodiments, user accounts are associated by actions, events, etc. For example, in an embodiment, an event log, network log, cloud log, a combination thereof, and the like, are accessed to detect event records, each event record including an action and an identifier of a user account. In an embodiment, the query system 130 is configured to determine a similarity between user accounts based on actions in the computing environment 110.

For example, according to an embodiment, where a first user account is associated with actions similar to a second user account, the query system 130 is configured to associate a representation of the first user account (e.g., a first node) and a representation of the second user account (e.g., a second node) with a representation of an identity (e.g., a third node) in the knowledge graph.

In an embodiment, the query system 130 is configured to receive a natural language query, and generate a response to the query based on the knowledge graph 120. This is discussed in more detail with respect to FIG. 2 below.

Figure 2:
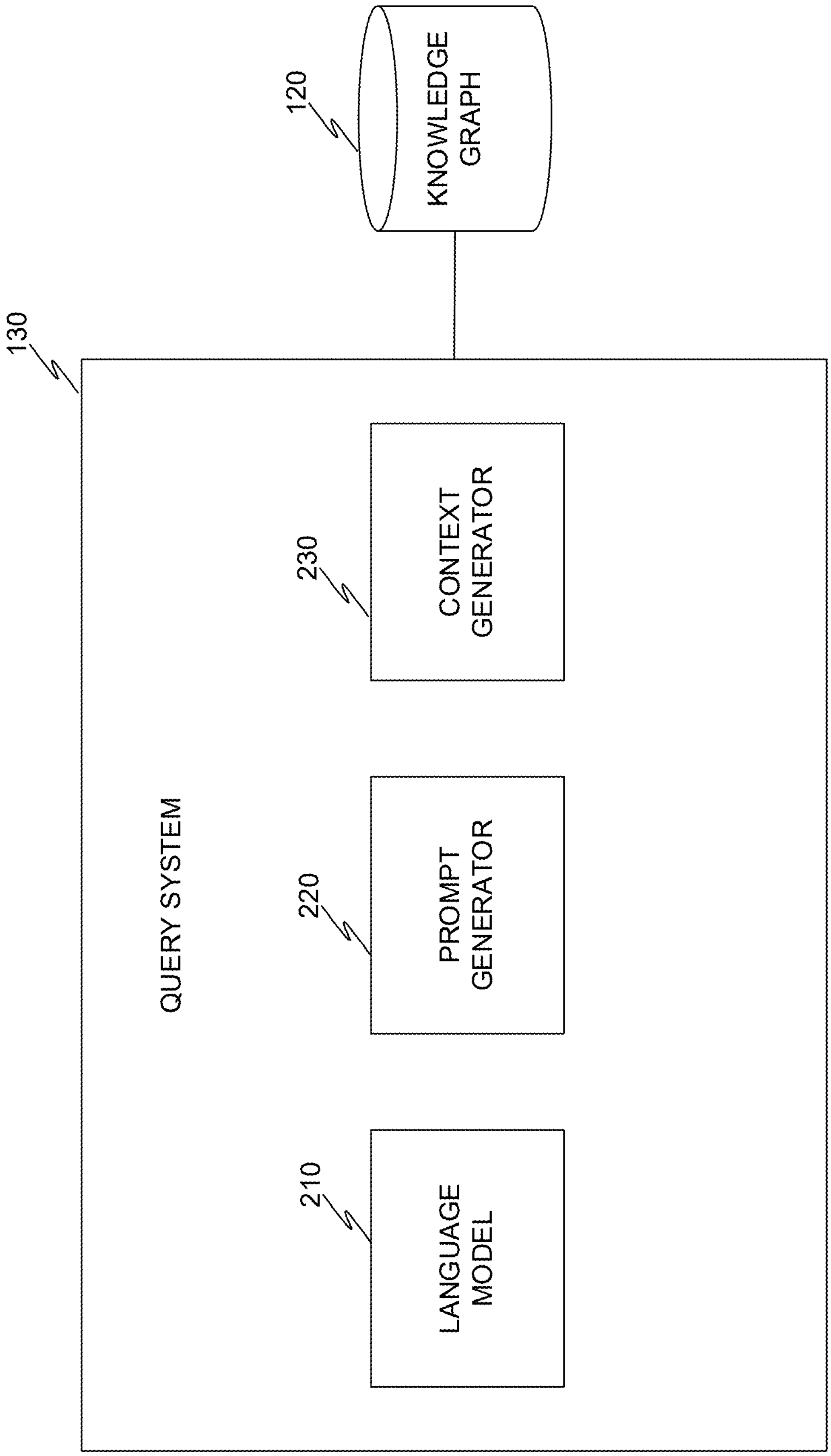
FIG. 2 is an example schematic illustration of a query system, implemented in accordance with an embodiment.

FIG. 2 is an example schematic illustration of a query system, implemented in accordance with an embodiment. According to an embodiment, a query system 130 includes a language model 210, a prompt generator 220, and a context generator 230. In an embodiment, the query system 130 is implemented as a virtual workload in a cloud computing environment, such as a virtual machine, a software container, a serverless function, a combination thereof, and the like.

In an embodiment, the language model 210 is a large language model, a small language model, and the like. A language model 210 is, for example, a GPT (generative pre-trained transformer), Google® Gemini, BERT, Meta® LLaMA, and the like. In some embodiments, the language model 210 incudes a context window, which refers to the size of input a language model 210 can process, while the context is additional data, information, schema, etc., which is utilized in addition to the prompt which supplied as an input.

In an embodiment, the language model 210 is fine-tuned, for example utilizing the knowledge graph 120. In some embodiments, the language model 210 does not require fine-tuning, instead being provided context data from the context generator 230.

In some embodiments, a prompt generator 220 is configured to receive a natural language query and generate a prompt for the language model 210. In some embodiments, the prompt generator 220 is configured to generate a prompt, for example based on a predefined prompt template.

In an embodiment, a natural language query is matched to a predefined prompt template. For example, matching is performed utilizing vectorization (e.g., vectorizing two inputs and measuring a distance between the vectors), utilizing a language model (e.g., prompting the language model to determine which prompt template should be used for the natural language query), a combination thereof, and the like.

In certain embodiments, the prompt generator 220 is configured to extract from the natural language query a computing environment entity. In an embodiment, a computing environment entity is a user identifier, a resource identifier, an issue identifier, a cybersecurity identifier, various combinations thereof, and the like.

According to an embodiment, the prompt generator 220 is configured to request a context from the context generator 230. In some embodiments, the prompt generator 220 is configured to request a context based on a determined context length. For example, in an embodiment, the language model 210 includes a context window, which corresponds to an input size the language model 210 is capable of processing. In an embodiment, the context window corresponds to a number of tokens of a tokenized input.

In some embodiments, the prompt generator 220 is configured to request context of a specific length, for example based on the context window size and a size of a tokenized input. In an embodiment, a tokenized input is a natural language query that has been tokenized.

For example, in certain embodiments, it is advantageous to configure the context generator 230 to generate a context which occupies a data size corresponding to the total context length minus the size of the tokenized input. This allows to fill the entire context window, which, according to an embodiment, increases the accuracy of a response generated by the language model 210.

In an embodiment, the context generator 230 is configured to generate a context by querying the knowledge graph 120. For example, in certain embodiments, the context generator 230 is configured to query the knowledge graph based on an extracted computing environment entity.

In an embodiment, the knowledge graph 210 is configured to detect a node representing the extracted computing environment entity. In some embodiments, the knowledge graph 210 is configured to traverse the graph to detect a second node, a plurality of second nodes, etc., which are connected to the node representing the extracted computing environment entity.

In some embodiments, a plurality of second nodes are detected. In an embodiment, a distance from the node representing the extracted computing environment entity is determined, and the graph is traversed to detect nodes which are up to the determined distance from the node. For example, where the distance is 2, nodes connected by hoping 2 nodes or less to the node representing the computing environment entity are considered for the context window.

In some embodiments, second nodes are selected for the context window based on a weight of the edges. For example, in an embodiment, the context generator 230 is configured to detect nodes which are connected to the node representing the computing environment entity, by an edge having a weight higher than a threshold value. In some embodiments, a plurality of second nodes are detected, and a second node having a highest weight is selected for context generation.

In an embodiment, selecting a node for context generation includes detecting a content, a computing environment entity, metadata, a combination thereof, and the like. For example, in an embodiment, the context generator 230 is configured to query the knowledge graph 120 to detect a node related to the extracted computing environment entity.

In some embodiments, the knowledge graph 120 detects a node which represents a knowledge base article, for example, a corporate wiki article. In an embodiment, the context generator 130 is configured to access the data source (e.g., the knowledge base article), and extract data therefrom to generate context for the language model 210.

Figure 3:
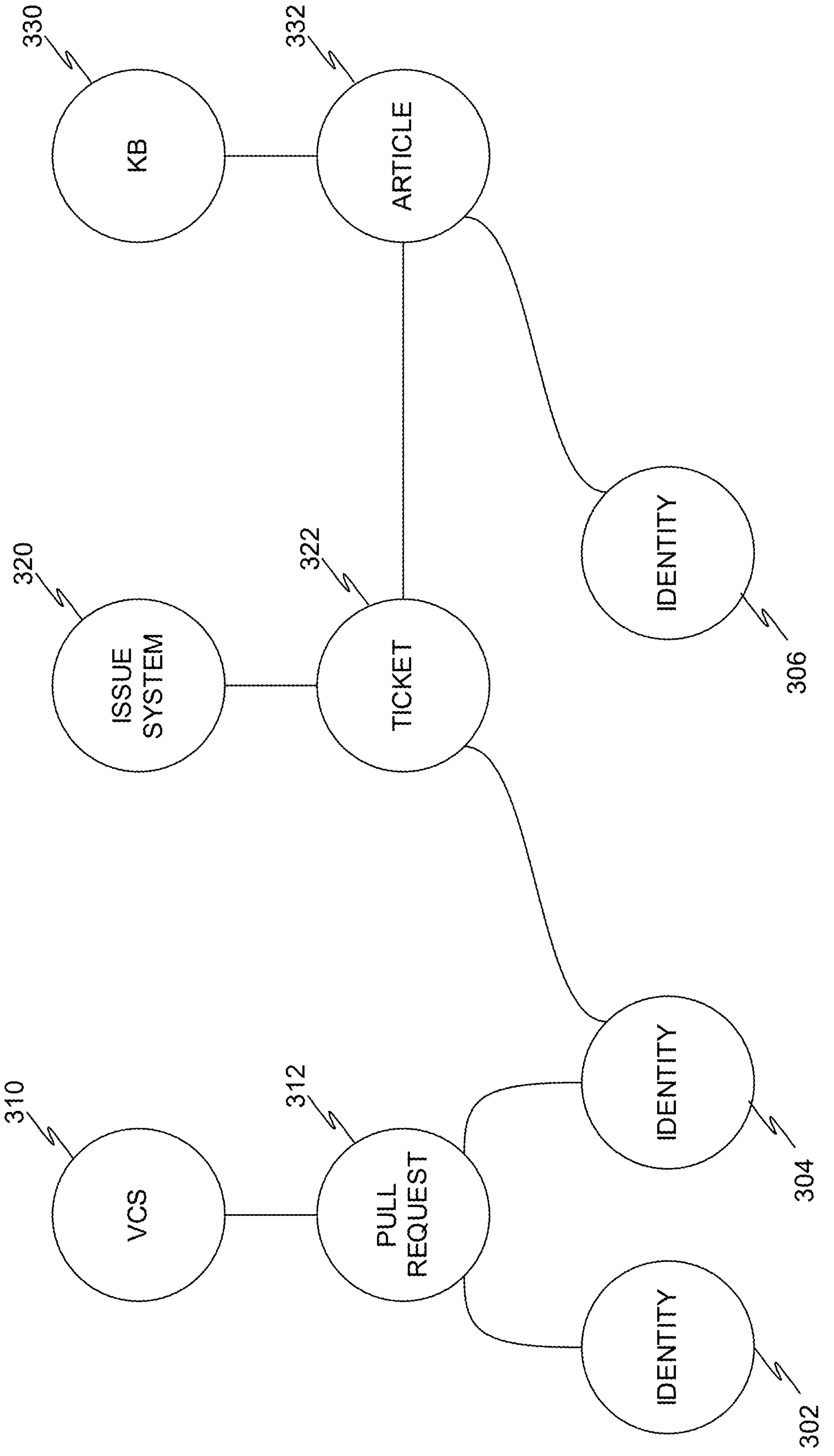
FIG. 3 is an example graph diagram of a knowledge graph, utilized to describe an embodiment.

FIG. 3 is an example graph diagram of a knowledge graph, utilized to describe an embodiment. In an embodiment, a knowledge graph is generated by a query system, for example based on multiple data sources of a computing environment.

The graph includes a plurality of nodes, each node representing a computing environment entity. In an embodiment, a computing environment entity is generated based on a predetermined data schema, for example of a specific data source.

According to an embodiment, a VCS node 310 represents a version control system, such as Github® which is utilized by the computing environment. In an embodiment, the VCS node 310 is connected to a PR node 312 which represents a pull request. According to an embodiment, the pull request is associated with a code object, a plurality of code objects, etc.

In some embodiments, a pull request is authored by a user utilizing a user account. In certain embodiments, a plurality of users author a pull request. In an embodiment, the PR node 312 is connected to a first identity node 302 and a second identity node 304.

According to an embodiment, an issue is detected, for example by a cybersecurity monitoring system (not shown) and a ticket is generated. In an embodiment, an issue monitoring system is represented by an issue system node 320, which is connected to a representation of the ticket, as ticket node 322.

In an embodiment, the ticket includes an identifier of the pull request corresponding to the code which caused the issue, and an identifier of two user accounts which are tasked with resolving the issue.

In this embodiment, the ticket node 322 is connected to the second identity node 304 since the second user account generated the pull request, and is further connected to an article node 322 which represents an article that teaches how to resolve an issue of this type.

According to an embodiment, the article node 322 is connected to a KB node 330 which represents a knowledge base where the article is stored, and is further connected to a third identity node 306, which represents a user account which authored the article.

Figure 4:
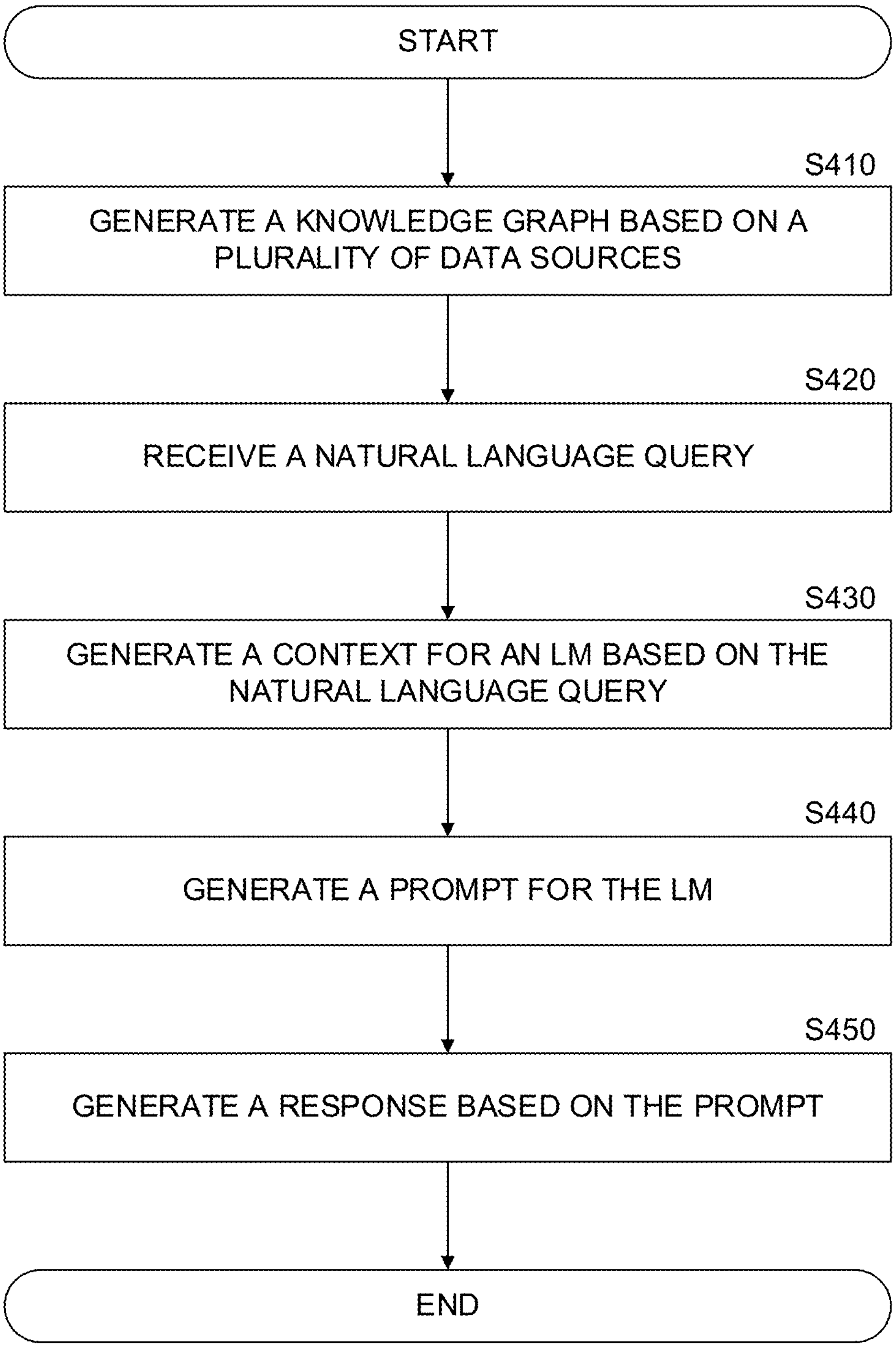
FIG. 4 is an example flowchart of a method for generating a query response from a knowledge base, implemented according to an embodiment.

FIG. 4 is an example flowchart of a method for generating a query response from a knowledge base, implemented according to an embodiment.

At S410, a knowledge graph is generated. In an embodiment, the knowledge graph is generated based on a plurality of data sources. According to an embodiment, a data source is a knowledge base system (e.g., a wiki, Confluence®, etc.), an issue tracking system, a cybersecurity monitoring system, a version control system, a messaging system, an IAM system, a cloud computing service, a combination thereof, and the like.

In some embodiments, each data source is associated with a data schema. In certain embodiments, the knowledge graph is generated based on the data schema. In an embodiment, the knowledge graph includes a plurality of nodes, each node representing a computing environment entity. A computing environment entity is, according to certain embodiments, a ticket, an alert, an article, a user account, a service account, a resource, a service, an action, an event, a log record, a message, various combinations thereof, and the like.

In certain embodiments, nodes in the knowledge graph are connected via edges. According to some embodiments, an edge is associated with a weight. In an embodiment, a plurality of weights are associated with an identity, such that a first plurality of weights for the knowledge graph edges is associated with a first identity, and a second plurality of weights for the knowledge graph edges is associated with a second identity.

In an embodiment, an edge is assigned a weight, for example based on a determined semantic distance between a first node and a second node. In some embodiments, an edge is assigned a weight based on the data source from which data related to the nodes is extracted.

At S420, a natural language query is received. In an embodiment, the natural language query is an unstructured query (e.g., not a SQL query) received in a natural language, such as English.

In some embodiments, the natural language query is processed to extract therefrom a computing environment entity. In an embodiment, the natural language query is parsed to detect various entities, and each entity is utilized in traversing the knowledge graph.

In an embodiment, the natural language query, a portion thereof, etc., is tokenized. In some embodiments, tokenizing a natural language query includes generating a token input for a language model based on the natural language query.

At S430, a context is generated. In an embodiment, the context is generated for a language model, such as a large language model (LLM), a small language model (SLM), a combination thereof, and the like.

In an embodiment, the context is generated based on a context length of a language model. In some embodiments, the context is generated further based on a tokenized natural language query. For example, in an embodiment, an amount of context data is generated, extracted, retrieved, a combination thereof, and the like, in order to fill the entire context window of a language model.

According to an embodiment, a computing environment entity is extracted, detected, a combination thereof, and the like, from the natural language query. In an embodiment, the knowledge graph is queried to detect a node which represents the computing environment entity. For example, in an embodiment, the computing environment entity is an identifier of a user account. In such an embodiment, the knowledge graph is queried based on the identifier of the user account.

In an embodiment, the knowledge graph is further queried to detect second nodes. A second node is a node which is connected to the node representing the computing environment entity. In some embodiments, a plurality of second nodes are detected. In certain embodiments, the graph is traversed to detect a second node which is connected to the node representing the computing environment entity through at least another node.

For example, in FIG. 3 above, the second identity node 304 is connected to the ticket node 322, such that the ticket node 322 is a second node to the second identity node 304. The article node 332 is connected to the ticket node 322 and is a second node to the second identity node, through two hops (one hop from the second identity node 304 to the ticket node 322, and a second hop from the ticket node 322 to the article node 332).

In certain embodiments, the context is generated based on a number of permissible hops (e.g., up to 3 hops from the detected node). In an embodiment, the context is generated based on a weight associated with an edge between a detected node and a second node. For example, in some embodiments, only nodes connected with edges having a weight value above a threshold value are utilized in generating the context.

In an embodiment, a second node having the highest weight value is utilized for generating the context. According to some embodiments, generating a context based on a node includes extracting data, metadata, and the like, from the node, and generating the context based on the extracted data, metadata, etc.

In some embodiments, generating a context based on a node includes accessing a computing environment entity which is represented by the node. For example, in an embodiment, the node represents a confluence page which has stored thereon unstructured data. In certain embodiments, the context is generated by determining that the context should be generated based on the node representing the confluence page, accessing the confluence page, extracting data therefrom, and generating the context based on the extracted data.

At S440, a prompt is generated. In certain embodiments, the prompt is generated for execution on a language model. In an embodiment, the prompt is generated based on a predetermined template. In some embodiments, the predefined template is selected based on the natural language query.

In an embodiment, the prompt includes a SQL query which is adapted based on the received natural language query. In some embodiments, the SQL query is executed on a database, such as the knowledge graph, a relational database, a combination thereof, and the like.

For example, according to an embodiment, the natural language query is matched to a predetermined template by querying an LLM to determine which of a plurality of predetermined prompt templates match the natural language query.

In other embodiments, the natural language query, a portion thereof, etc., are vectorized, and a corresponding vector is generated for each of a plurality of predetermined templates. In an embodiment, a template is selected based on a minimal vector distance. In some embodiments, the vector distance between a vector of a prompt template and a vector of a natural language query is required to be below a predefined threshold.

In an embodiment, the prompt is generated based on a tokenized natural language query, a generated context, and a combination thereof. In some embodiments, the prompt, the context, a combination thereof, and the like, are generated further based on a context window of the language model.

In certain embodiments, a user session includes providing the language model with a query (i.e., natural language query), and receiving responses. In some embodiments, a number of queries, responses, and the like, are added to the generated context. In an embodiment, the context length includes a predetermined amount of data from a user session (e.g., queries and responses) and a predetermined amount of data of generated context (i.e., context generated based at least in part on querying the knowledge base).

At S450, the prompt is processed. In an embodiment, the prompt is processed by a language model, such as a large language model (LLM). In some embodiments, the prompt, when processed, configures the LLM to generate an output. In an embodiment, the output includes a response to the natural language query.

In some embodiments, the output is utilized by the language model as context for a next query received from a user of the user session. In an embodiment, a predetermined number of queries and responses are stored, utilized, etc., in the context window of the language model.

Figure 5:
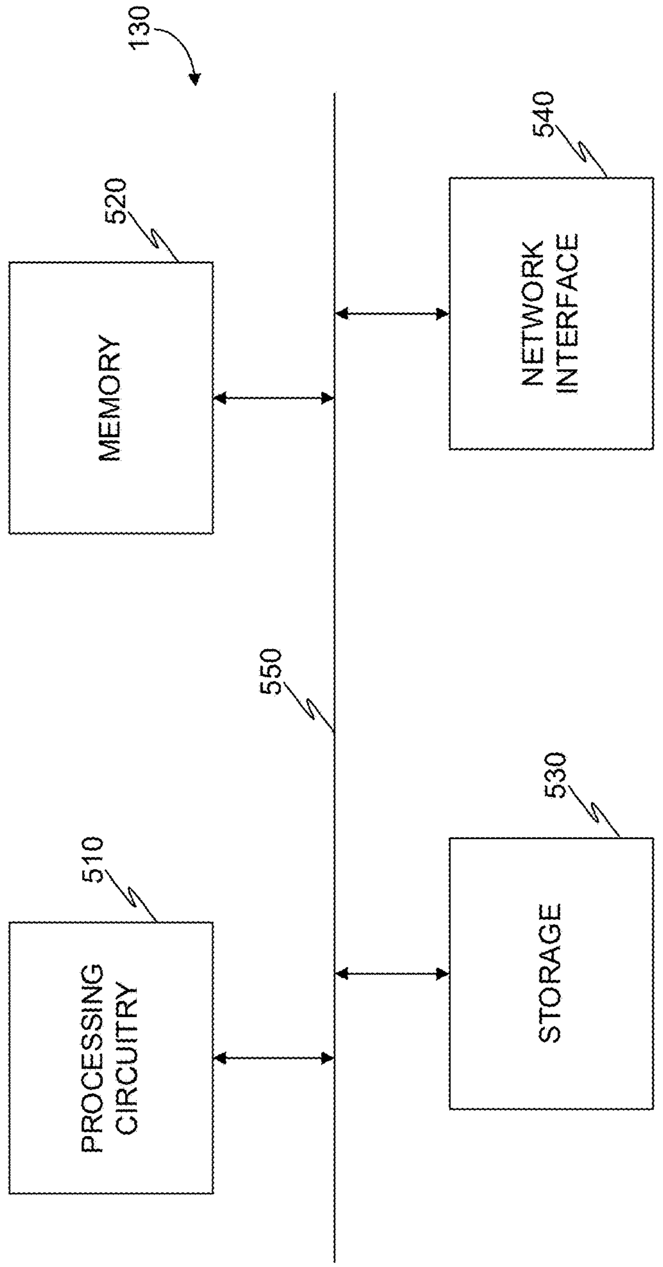
FIG. 5 is an example schematic diagram of a query system according to an embodiment.

FIG. 5 is an example schematic diagram of a query system 130 according to an embodiment. The query system 130 includes, according to an embodiment, a processing circuitry 510 coupled to a memory 520, a storage 530, and a network interface 540. In an embodiment, the components of the query system 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the query system 130 with communication with, for example, the computing environment 110, knowledge graph 120, and the like, according to an embodiment.

It should be understood that the embodiments described herein are not limited to the specific architecture illustrated in FIG. 5, and other architectures may be equally used without departing from the scope of the disclosed embodiments.

Furthermore, in certain embodiments the knowledge graph 120, query system 130, a combination thereof, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a query response from a knowledge base, comprising:

generating a knowledge graph based on a plurality of data sources of a computing environment, wherein a first data source of the plurality of data sources is based on a first schema and a second data source of the plurality of data sources is based on a second schema, which is different from the first schema, wherein the knowledge graph including a plurality of nodes representing computing environment entities, and wherein an edge of a node is assigned a weight based at least on a data source of the plurality of data sources corresponding to a computing environment entity represented by the node and a semantic distance between a first node and a second node of the plurality of nodes;

receiving, by a prompt generator, a natural language query;

extracting from the received natural language query at least a computing environment entity;

traversing the knowledge graph to detect the second node connected to the first node representing the computing environment entity;

tokenizing the natural language query;

determining a size of tokenized input based on the tokenized natural language query;

generating a context for a language model, wherein the generated context includes data extracted from the second node, and a data size of a context window of the language model consists of a size of the generated context and the size of the tokenized input;

generating a prompt for the language model based on the generated context and the received natural language query;

processing the generated prompt based on the generated context and the received natural language query and utilizing the language model to generate a response based on the prompt;

including the natural language query and the response in the context window of the language model;

receiving a second natural language query, wherein the second natural language query is received after the natural language query; and processing the second natural language query based on the context window.

2. The method of claim 1, further comprising:

accessing a version control system (VCS) of the computing environment; and generating the knowledge graph based on metadata and data extracted from the VCS.

3. The method of claim 2, further comprising:

generating a third node in the knowledge graph, the third node representing a code object accessed through the VCS.

4. The method of claim 1, further comprising: accessing an issue tracking system of the computing environment;

extracting data related to the computing environment entity from a ticket of the issue tracking system; and generating a representation in the knowledge graph of the computing environment entity based on the extracted data.

5. The method of claim 1, further comprising:

determining a context length of the language model; and continuously traversing the knowledge graph to detect a plurality of second nodes.

6. The method of claim 5, further comprising:

generating the context based on the plurality of second nodes and the determined context length.

7. The method of claim 1, further comprising:

generating the prompt further based on a preexisting prompt template.

8. The method of claim 7, further comprising:

processing a predetermined prompt by the language model based on the preexisting prompt template, the generated context and the received natural language query.

9. The method of claim 1, further comprising:

traversing the knowledge graph to detect a plurality of neighbor nodes, each neighbor node connected to the first node by a number of nodes less than a predetermined value.

10. The method of claim 1, further comprising:

generating the knowledge graph prior to receiving the natural language query.

11. The method of claim 1, further comprising:

generating a relevancy score for each data source of the plurality of data sources.

12. The method of claim 11, further comprising:

generating the relevancy score for each identity of a plurality of identities.

13. The method of claim 11, further comprising: generating the context further based on the relevancy score.

14. A non-transitory computer-readable medium storing a set of instructions for generating a query response from a knowledgebase, the set of instructions comprising:

one or more instructions that, when executed by one or more processing circuitries of a device, cause the device to:

generate a knowledge graph based on a plurality of data sources of a computing environment, wherein a first data source of the plurality of data sources is based on a first schema and a second data source of the plurality of data sources is based on a second schema, which is different from the first schema, wherein the knowledge graph including a plurality of nodes representing computing environment entities, and wherein an edge of a node is assigned a weight based at least on a data source of the plurality of data sources corresponding to a computing environment entity represented by the node and a semantic distance between a first node and a second node of the plurality of nodes;

receive, by a prompt generator, a natural language query;

extract from the received natural language query at least a computing environment entity;

traverse the knowledge graph to detect the second node connected to the first node representing the computing environment entity;

tokenize the natural language query;

determine a size of tokenized input based on the tokenized natural language query;

generate a context for a language model, wherein the generated context includes data extracted from the second node, and a data size of a context window of the language model consists of a size of the generated context and the size of the tokenized input;

generate a prompt for the language model based on the generated context and the received natural language query;

process the generated prompt based on the generated context and the received natural language query and utilizing the language model to generate a response based on the prompt;

include the natural language query and the response in the context window of the language model;

receive a second natural language query, wherein the second natural language query is received after the natural language query; and process the second natural language query based on the context window.

15. A system for generating a query response from a knowledge base comprising:

one or more processing circuitries configured to:

generate a knowledge graph based on a plurality of data sources of a computing environment, wherein a first data source of the plurality of data sources is based on a first schema and a second data source of the plurality of data sources is based on a second schema, which is different from the first schema, wherein the knowledge graph including a plurality of nodes representing computing environment entities, and wherein an edge of a node is assigned a weight based at least on a data source of the plurality of data sources corresponding to a computing environment entity represented by the node and a semantic distance between a first node and a second node of the plurality of nodes;

receive, by a prompt generator, a natural language query;

extract from the received natural language query at least a computing environment entity;

traverse the knowledge graph to detect the second node connected to the first node representing the computing environment entity;

tokenize the natural language query;

determine a size of tokenized input based on the tokenized natural language query;

generate a context for a language model, wherein the generated context includes data extracted from the second node, and a data size of a context window of the language model consists of a size of the generated context and the size of the tokenized input;

generate a prompt for the language model based on the generated context and the received natural language query;

process the generated prompt based on the generated context and the received natural language query and utilizing the language model to generate a response based on the prompt;

include the natural language query and the response in the context window of the language model;

receive a second natural language query, wherein the second natural language query is received after the natural language query; and process the second natural language query based on the context window.

16. The system of claim 15, wherein the one or more processing circuitries are further configured to:

access a version control system (VCS) of the computing environment; and generate the knowledge graph based on metadata and data extracted from the VCS.

17. The system of claim 16, wherein the one or more processing circuitries are further configured to:

generate a third node in the knowledge graph, the third node representing a code object accessed through the VCS.

18. The system of claim 15, wherein the one or more processing circuitries are further configured to:

access an issue tracking system of the computing environment;

extract data related to the computing environment entity from a ticket of the issue tracking system; and generate a representation in the knowledge graph of the computing environment entity based on the extracted data.

19. The system of claim 15, wherein the one or more processing circuitries are further configured to:

determine a context length of the language model; and continuously traverse the knowledge graph to detect a plurality of second nodes.

20. The system of claim 19, wherein the one or more processing circuitries are further configured to:

generate the context based on the plurality of second nodes and the determined context length.

21. The system of claim 15, wherein the one or more processing circuitries are further configured to:

generate the prompt further based on a preexisting prompt template.

22. The system of claim 21, wherein the one or more processing circuitries are further configured to:

process a predetermined prompt by the language model based on the preexisting prompt template, the generated context and the received natural language query.

23. The system of claim 15, wherein the one or more processing circuitries are further configured to:

traverse the knowledge graph to detect a plurality of neighbor nodes, each neighbor node connected to the first node by a number of nodes less than a predetermined value.

24. The system of claim 15, wherein the one or more processing circuitries are further configured to:

generate the knowledge graph prior to receiving the natural language query.

25. The system of claim 15, wherein the one or more processing circuitries are further configured to:

generate a relevancy score for each data source of the plurality of data sources.

26. The system of claim 25, wherein the one or more processing circuitries are further configured to:

generate the relevancy score for each identity of a plurality of identities.

27. The system of claim 25, wherein the one or more processing circuitries are further configured to:

generate the context further based on the relevancy score.

* * * * *